Aug. 2, 1966 S. M. PHELPS ET AL 3,264,598

CONNECTOR FOR CIRCUIT BOARDS

Original Filed Sept. 15, 1960 2 Sheets-Sheet 1

*INVENTORS*
S.M. PHELPS AND
F.A. DALY
BY
Forest B. Hitchcock
THEIR ATTORNEY

CONNECTOR FOR CIRCUIT BOARDS

Original Filed Sept. 15, 1960

2 Sheets-Sheet 2

INVENTORS
S.M.PHELPS AND
F.A.DALY
BY Forrest B. Hitchcock
THEIR ATTORNEY

United States Patent Office 3,264,598

Patented August 2, 1966

3,264,598
CONNECTOR FOR CIRCUIT BOARDS

Stuart M. Phelps and Frank A. Daly, Rochester, N.Y., assignors to General Signal Corporation, a corporation of New York Original application Sept. 15, 1960, Ser. No. 56,231, now Patent No. 3,123,800, dated Mar. 3, 1964. Divided and this application Oct. 2, 1963, Ser. No. 313,339
1 Claim. (Cl. 339—17)

This application is a division of our application Ser. No. 56,231, filed September 15, 1960, now Patent No. 3,123,800, dated March 3, 1964.

This invention relates to connectors for circuit boards, and it more particularly pertains to connectors for connecting together and supporting adjoining circuit boards.

It is proposed, according to the present invention to provide a control machine in which a plurality of rows of printed circuit boards are stacked in columns, with the boards of each column being supported and connected electrically by quickly detachable electrical connectors. The circuit boards are formed with a plurality of conductors along their upper and lower longitudinal edges. The connector provided according to the present invention is a longitudinal connector that is disposed between the circuit boards in each column, the connector having slots formed in upper and lower sides thereof for engaging the longitudinal sides respectively of adjoining circuit boards. A plurality of conductors are secured in transverse slots in the connector which connect electrically contacts of the adjoining boards because of contact with the board conductors within the longitudinal slots.

The connectors in each row are quickly detachable from the boards in that they are secured within a housing by a quickly detachable strap, which, when removed, permits the removal longitudinally of the connectors from the rear of the control machine.

An object of the present invention is to provide quickly detachable connectors for jointly supporting circuit boards along longitudinal edges and for connecting together a plurality of circuits of the adjoining boards in each column.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which.

Figure 1:
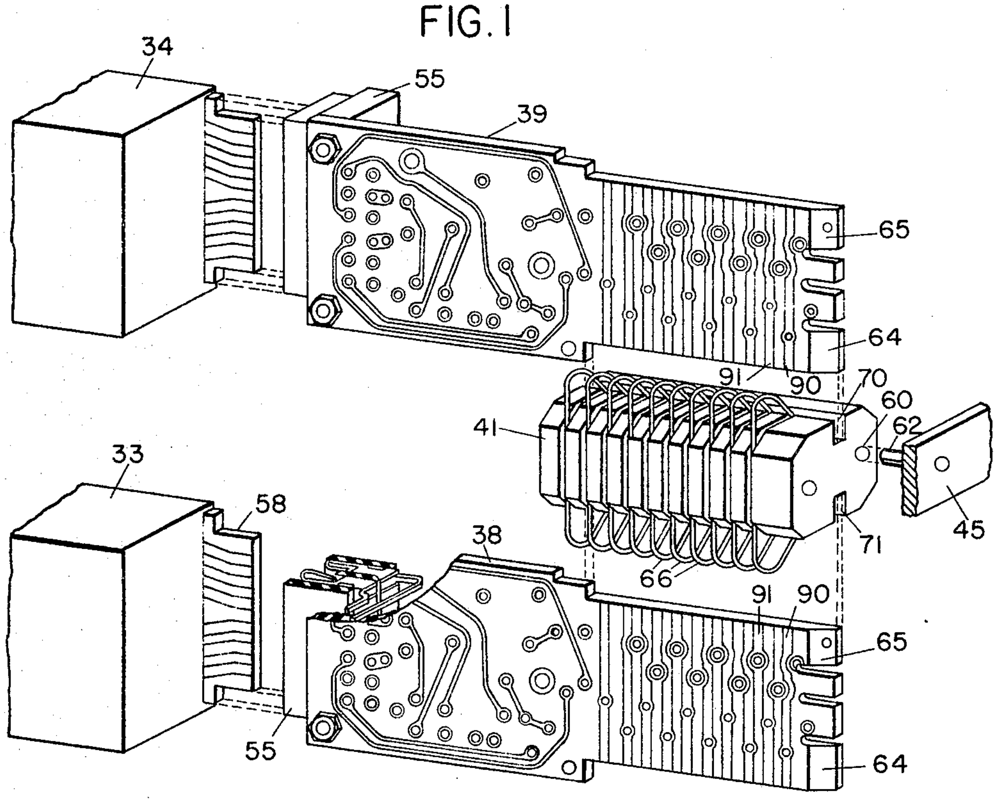
FIG. 1 is an exploded perspective view showing a connector according to the present invention disposed between longitudinal edges of adjoining circuit boards in a column.
Figure 2:
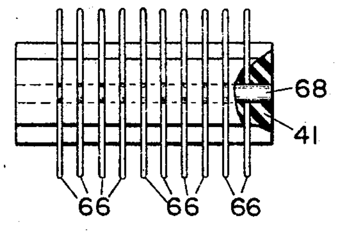
FIG. 2 is an elevational view of the connector shown in FIG. 1.
Figure 3:
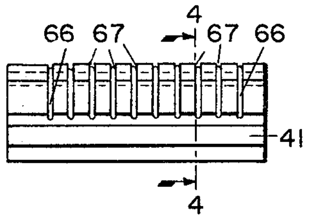
FIG. 3 is a plan view of the connector shown in FIG. 1.

With reference to FIG. 1, changeable display indicators 33 and 34 are disposed elevationally one above the other in a column in a control machine.

A printed circuit board 38 is provided for controlling the indicator 33, and a printed circuit board 39 is provided for controlling the indicator 34. The indicator 33 and the circuit board 38 have their respective control circuits connected together by a plug connector including a printed circuit portion 58 secured to the indicator 33, and a cooperating connector 55 secured to the printed circuit board 38. The printed circuit board 39 is similarly connected to the indicator 34. Each of the circuit boards 38 and 39 has a plurality of transverse printed circuit contact strips such as the contact strips 90 and 91. These contact strips are connected through the associated circuit boards to horizontal circuit strips (not shown) on the other side of the boards for the control of the associated indicator.

A connector 41 extends longitudinally along the adjoining longitudinal edges of circuit boards 38 and 39, the connector 41 is formed of a block of insulating material having a longitudinal slot 70 formed therein for receiving a portion of the lower longitudinal edge of circuit board 39, and a similar slot 71 is formed in the bottom of the connector 41 for receiving a portion of the upper longitudinal edge of the circuit board 38.

Figure 4:
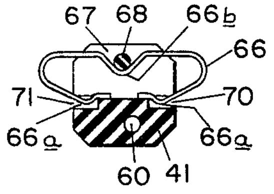
FIG. 4 is a sectional view of the connector taken along the line 4—4 of FIG. 3.

The connector 41 has a transverse slot 67 formed therein for receiving a wire contact 66 for each of the contact strips, such as the contact strips 90 and 91, of the printed circuit boards 38 and 39. With reference to FIG. 4, each of the wire contacts 66 is illustrated as being formed, for example, by a nearly closed loop of spring wire contact material, the ends of the loop extending into the slots 70 and 71 respectively and having spring detents **66*a* formed therein to make contact with the contact strips 90 and 91 for example, of the printed circuit boards 38 and 39**.

The contact loops 66 are retained in the respective slots 67 of the connector 41 by a longitudinal insulating pin 68 which extends throughout the length of the connector 41 and passes back of recesses **66*b* of the contact loops 66 so as to maintain such loops under compression and bias the ends thereof against the bottoms of the associated slots 67**.

Figure 5:
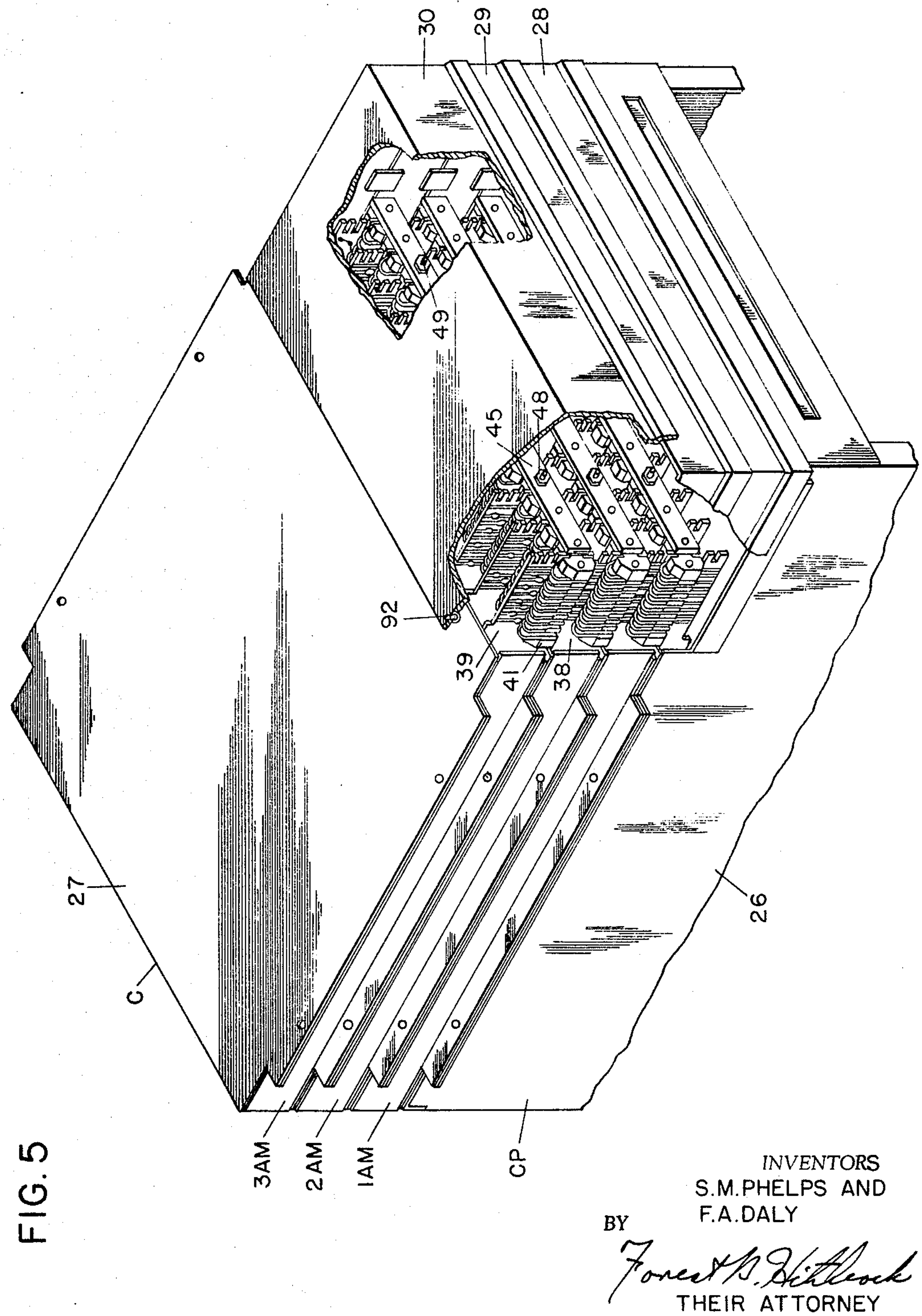
FIG. 5 is a view in perspective, with certain parts broken away, of a control machine employing circuit boards supported and electrically connected by quickly detachable connectors according to the present invention.

With reference to FIG. 5, one use of the connector 41 provided according to the present invention is illustrated in an air-traffic control machine 26 which has a control panel CP, and modular rows of indicators 1AM, 2AM and 3AM, stacked in a column, each row being generally associated with a particular flight altitude. The modular units 1AM and 2AM have respective covers 28 and 29 about their peripheries. A top cover C covers the top modular unit 3AM, this cover having forward and rear portions 27 and 30 which are secured together by screws 92.

The connectors 41 are adapted to be detachably connected to a fixed support bar 45 (see FIGS. 1 and 5) by having longitudinal openings 60 formed therein for receiving pins 62 of the fixed support bar 45. The bar 45 is in turn secured in the housing 26 (see FIG. 5) by nuts 48 and 49. Thus the connector 41 is supported by the bar 45, and it in turn supports the circuit boards 38 and 39 as is shown in FIG. 5, as well as making electrical connections between the adjoining circuit boards.

When the bar 45 is removed, by first removing nuts 48 and 49, the connectors 41 in the associated row of the control machine 26 can be selectively removed by sliding them longitudinally off the ends of the associated printed circuit boards. To facilitate the replacement of the connectors 41 after they have been removed longitudinally, the circuit boards 38 and 39 have their ends tapered at the points 64 and 65.

Having described a connector for printed circuit boards of a control machine as one specific embodiment of the present invention, it is to be understood that this form is selected to facilitate in the disclosure of the invention, rather than to limit the number of forms which the invention may assume; and, it is to be further understood that various modifications, adaptations and alterations may be applied to the specific form shown to meet the requirements of practice, without in any manner departing from the spirit or scope of the present invention.

What we claim is:

In a control machine comprising a plurality of longitudinal printed circuit boards arranged in rows and columns and having conductors for electrical connection along their longitudinal edges, (a) a connector for connecting the conductors of a longitudinal edge of one printed circuit board with the conductors of a longitudinal edge of another circuit board repsectively, comprising, (b) a longitudinal block of insulating material disposed between the adjoining longitudinal edges of two of said circuit boards and having longitudinal slots formed therein along two opposite sides for receiving the longitudinal edges of said one and said another circuit boards respectively, (c) said block having a plurality of transverse slots formed therein, and (d) an interconnecting conductor disposed in each of said plurality of transverse slots extending between the longitudinal slots in the opposite sides of the block, each said conductor being formed by a nearly closed loop of resilient wire having its ends extending into the longitudinal slots respectively and said plurality of conductors being retained in their respective slots under compression by a longitudinal pin of insulating material extending longitudinally through the block to maintain contact with their respective conductors on the said one and said another circuit boards.

References Cited by the Examiner

UNITED STATES PATENTS

| | | | |
|---|---|---|---|
| 2,891,229 | 6/1959 | Flanagan | 339—17 |
| 2,944,121 | 7/1960 | Wasylenko | 339—17 |

PATRICK A. CLIFFORD, *Primary Examiner.*

ALFRED S. TRASK, *Examiner.*